(12) United States Patent
Jeppsson et al.

(10) Patent No.: US 10,735,174 B2
(45) Date of Patent: Aug. 4, 2020

(54) EXCLUSION OF CELLULAR SCHEDULING TO ALLOW SHARING OF RESOURCES BETWEEN CELLULAR AND NON-CELLULAR RADIO ACCESS TECHNOLOGIES

(71) Applicant: Telefonaktiebolaget LM Ericsson (publ), Stockholm (SE)

(72) Inventors: Henrik Jeppsson, Lund (SE); Carola Faronius, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/327,548

(22) PCT Filed: Aug. 22, 2017

(86) PCT No.: PCT/EP2017/071101
§ 371 (c)(1),
(2) Date: Feb. 22, 2019

(87) PCT Pub. No.: WO2018/036998
PCT Pub. Date: Mar. 1, 2018

(65) Prior Publication Data
US 2019/0190683 A1 Jun. 20, 2019

Related U.S. Application Data

(60) Provisional application No. 62/378,417, filed on Aug. 23, 2016.

(51) Int. Cl.
*H04W 76/16* (2018.01)
*H04L 5/00* (2006.01)
(Continued)

(52) U.S. Cl.
CPC ............ *H04L 5/0098* (2013.01); *H04L 5/001* (2013.01); *H04L 47/20* (2013.01); *H04W 76/16* (2018.02); *H04W 76/25* (2018.02); *H04W 76/28* (2018.02)

(58) Field of Classification Search
CPC ..... H04W 76/28; H04W 76/16; H04W 76/25; H04L 5/0098; H04L 47/20; H04L 5/001
See application file for complete search history.

(56) References Cited

U.S. PATENT DOCUMENTS

| | | | | |
|---|---|---|---|---|
| 2014/0079007 A1* | 3/2014 | Li | ................. | H04W 28/10 370/329 |
| 2014/0378157 A1* | 12/2014 | Wei | ................. | H04W 16/14 455/454 |
| 2018/0103458 A1* | 4/2018 | Tooher | ............ | H04W 16/14 |

OTHER PUBLICATIONS

Motorola Mobility, "Activation/Deactivation procedures for LAA Scells", 3GPP TSG RAN WG1#83, Nov. 15-22, 2015, pp. 1-3, Anaheim, US, R1-157216.
(Continued)

*Primary Examiner* — Lan-Huong Truong
(74) *Attorney, Agent, or Firm* — Coats & Bennett, PLLC (57) ABSTRACT

Exclusion functionality for License Assisted Access, LAA, in LTE is defined. LAA exclusion is a temporary deactivation or throttling of scheduling on LAA Secondary Cells (SCells), which allows a requesting UE (11) to periodically, or upon demand, send data or perform measurements on Wi-Fi networks using the same receiver circuitry (18), e.g., radio front end, without risk of losing LAA traffic. A UE sends an exclusion request to its serving base station, eNB (31) and receives an acknowledgement. The UE (11) may include parameters, e.g., duration or periodicity, in the request, and the acknowledgement may include overriding parameters. By the introduction of the exclusion functionality, the UE (11) can share receiver circuitry (18) between (Continued)

Wi-Fi and LAA, hence reducing hardware device size, cost, and power consumption.

25 Claims, 7 Drawing Sheets

(51) Int. Cl.
*H04W 76/25* (2018.01)
*H04W 76/28* (2018.01)
*H04L 12/813* (2013.01)

(56) References Cited

OTHER PUBLICATIONS

Samsung, "Carrier aggregation with LAA SCell", 3GPP TSG-RAN WG2#89, Feb. 9-13, 2015, pp. 1-3, Athens, Greece, R2-150415.
Apple, et al., "Concurrent LAA/Wi-Fi Using RX Sharing", 3GPP TSG-RAN WG2 #97, Feb. 13-17, 2017, pp. 1-3, Athens, Greece, R2-1701756.
Apple, "LAA/WiFi sharing indiction", 3GPP TSG-RAN WG2 #98, May 15-19, 2017, pp. 1-39, Hangzhou, China, R2-1706146.

* cited by examiner

EXCLUSION OF CELLULAR SCHEDULING TO ALLOW SHARING OF RESOURCES BETWEEN CELLULAR AND NON-CELLULAR RADIO ACCESS TECHNOLOGIES

RELATED APPLICATIONS

This application claims benefit of U.S. Provisional Patent Application 62/378,417, titled "Efficient Wi-Fi and LTE LAA Sharing," filed Aug. 23, 2016, the disclosure of which is incorporated herein by reference in its entirety.

FIELD OF INVENTION

The present invention relates generally to wireless communications, and in particular to concurrent access by a radio network device to both a cellular network and non-cellular (e.g., Wi-Fi) network, using the same radio receiver circuitry.

BACKGROUND

Long Term Evolution (LTE) is a sophisticated, $4^{th}$ generation wireless communication network protocol promulgated by the Third Generation Partnership Project (3GPP). The primary LTE Radio Access Network (RAN) is the Evolved Universal Mobile Telecommunications System (UMTS) Terrestrial RAN, or E-UTRAN. License Assisted Access (LAA) is a technology adopted by 3GPP to standardize operation of the LTE protocol in unlicensed spectrum, such as the 5 GHz band populated by Wireless Local Area Networks (WLAN) such as those conforming to the IEEE 802.11x protocols, commonly known as "Wi-Fi." It is anticipated that future radio network devices, known as User Equipment (UE) in LTE, will operate in both types of networks. As used herein, the term "UE" refers to any radio network device operative in the LTE network, whether or not it has a "user," e.g., including Machine-to-Machine (M2M) devices, Narrowband Internet of Things (NB-IoT) devices, laptop or tablet computers, and the like.

Figure 1:
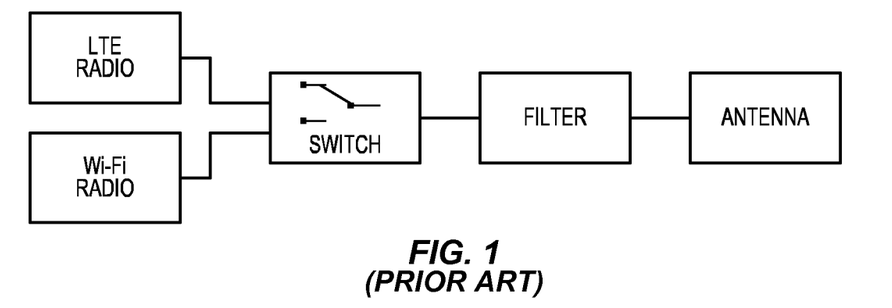
FIG. 1 is a block diagram of a prior art UE thats support both LTE and Wi-Fi access, requiring two separate RF front ends.

Current Wi-Fi enabled devices usually probe Wi-Fi frequencies with a periodicity—e.g., approximately once per second—to find suitable Access Points (AP), such as Wi-Fi cells, for mobility and/or multipath data traffic, such as utilizing Multipath Transmission Control Protocol (Multipath TCP). Currently, neither 3GPP nor IEEE 802.11x specifications provide for measurements of, or access to, the other domain. Since the UE must remain connected to the LTE network and respond to any signaling directed to it, current Wi-Fi enabled UEs require two separate radio "front ends." As used herein, a radio front end is a portion of the device's receiver circuitry (which may include, e.g., antennas, RF filters, low-noise amplifiers, and the like) upstream of the radio modem circuits. One radio front end is required for LTE communications and another for the WLAN measurements and connectivity, as depicted in FIG. 1. This requirement of dual radio front ends increases the size, cost, and complexity of the UE, and increases its power consumption, in turn decreasing the useful life between battery recharges.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention described and claimed herein, an LAA exclusion functionality is defined. LAA exclusion is a temporary deactivation or throttling of LAA Secondary Cells (SCells), which gives a UE requesting the exclusion a possibility to either periodically, or upon demand, perform measurements on Wi-Fi networks using the same (or parts of the same) radio receiver circuitry.

A protocol and configuration is defined for the UE to request its serving base station (known in LTE as eNodeB or eNB) to prepare a temporary exclusion of activity on LAA SCells for a time period, optionally with a periodicity, to deactivate or throttle one or more of the LAA SCells for that UE. The UE may also signal the length of the deactivation or throttling, e.g., in cases where the UE has other ongoing tasks that occupy receiver circuitry in a non-cellular access domain (e.g., Wi-Fi).

By the introduction of the deactivation or throttling functionality, the UE can share the radio receiver circuitry between Wi-Fi and LAA, hence reducing hardware device cost, achieving a smaller form factor, and reducing power consumption which prolongs battery life.

One embodiment relates to a method in a radio network device of utilizing the same receiver circuits to receive signals in two different radio access technologies. The radio network device is connected to a cellular radio access technology. A need to send data or measure on a non-cellular radio access technology is detected. An exclusion request is sent to a serving network node of the cellular radio access technology. An exclusion request acknowledgement is received from the serving network node. A sharing mode is entered. In the sharing mode, the receiver circuitry is switched to the non-cellular radio access technology at least part of the time.

Another embodiment relates to a radio network device. The device includes one or more antennas and a transceiver including shared front-end receiver circuitry. Processing circuitry is operatively connected to the transceiver. The processing circuitry is operative to detect a need to send data or measure on a non-cellular radio access technology; send an exclusion request to a serving network node of the cellular radio access technology; receive an exclusion request acknowledgement from the serving network node; enter a sharing mode; and in the sharing mode, switch the receiver circuitry to the non-cellular radio access technology at least part of the time.

Yet another embodiment relates to a method, in a radio network node operative in a cellular wireless communication system, for selectively scheduling traffic to a specific requesting radio network device connected to the cellular system. This allows the device to share receiver circuitry between the cellular radio access technology and a non-cellular radio access technology. An exclusion request is received from a radio network device. The exclusion request is granted, and an exclusion request acknowledgement is sent to the radio network device. Scheduling of cellular traffic to the radio network device is suspended.

Still another embodiment relates to a radio network node. The node includes one or more antennas and a transceiver. Processing circuitry is operatively connected to the transceiver, and is operative to receive an exclusion request from a radio network device; grant the exclusion request; send an exclusion request acknowledgement to the radio network device; and suspend scheduling cellular traffic to the radio network device.

Yet another embodiment relates to a method in a wireless communication device, UE, for sharing a radio chain, e.g. filter and antenna, between two or more radio access technologies in the same frequency range, for example LAA LTE and Wi-Fi, the wireless communication device being connected to a first cellular radio access technology. A need to send data or measure on another, non-cellular, available radio access technology, e.g. Wi-Fi, is detected. A LAA exclusion, e.g. throttling or deactivation, request is sent to a node, e.g. eNB of the first radio access technology. An acknowledgement is received from said node. A sharing parameter is set between the two radio access technologies. A sharing mode is entered. In the sharing mode, the radio chain is switched in time between the two radio access technologies according to the sharing parameter.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In particular, embodiments of the present invention are explained in the context of a UE operating in an LTE cellular network and a Wi-Fi non-cellular network. However, those of skill in the art will readily appreciate that the invention is not limited to this specific example, and may be advantageously applied to any radio network device operative in both cellular and non-cellular networks. In this description, well known methods and structures have not been described in detail so as not to unnecessarily obscure the present invention.

Embodiments of the present invention introduce LAA deactivation or throttling functionality triggered by a UE. The UE may be provided with any of a number of different cellular radio access technologies, such as 2G (Global System for Mobile Communications, or GSM), 3G (UTRAN) and 4G (E-UTRAN or LTE) as well as local area network radio access technologies, such as Wi-Fi.

According to embodiments of the invention, when the UE detects a need to send data or perform measurements on an available non-cellular radio access technology, e.g., Wi-Fi, the UE signals to the eNB a request for LAA SCell exclusion, i.e., temporary throttling or deactivation of the LAA SCell for that UE's traffic.

In one embodiment, the request is sent via MAC layer signaling, and contains the throttling or deactivation request—referred to herein collectively as an exclusion request. The exclusion request may additionally include a periodicity (if applicable) and the length for the throttling/deactivation, depending on the actual tasks applicable (i.e., an estimated time that the Wi-Fi traffic will occupy the receiver circuitry in the non-cellular access domain).

Figure 2:
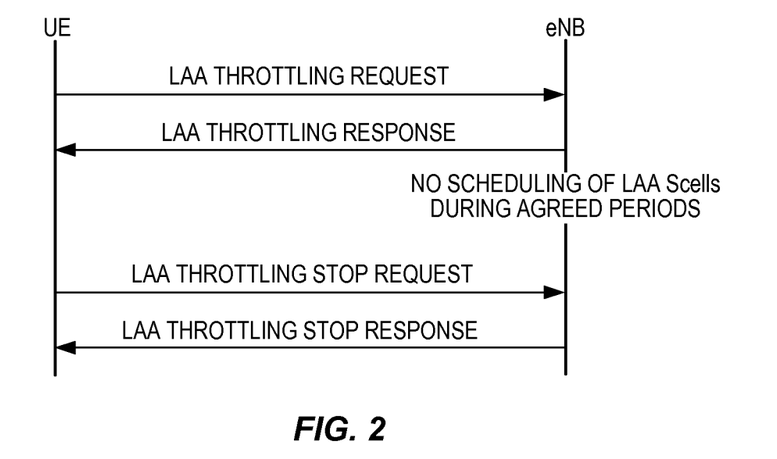
FIG. 2 is a signaling diagram of LAA throttling begin and end control plane signaling.

In this context, throttling means that the eNB is requested not to schedule any traffic in the SCell for the specific UE making the request. The SCell may remain active, and only the specific, requesting UE is affected. FIG. 2 depicts a representative signaling diagram depicting the throttling begin/end control plane signaling. Initially, the UE sends a LAA throttling request to the eNB. The request may include periodicity (if applicable) and the length for the throttling, depending on an estimated duration for known tasks in the non-cellular access technology. The eNB sends the UE a LAA throttling response, which may be a denial or acknowledgement. Rejection can be signaled occasionally by eNB in case prioritized traffic is required. If an acknowledgement, the response may include parameters, such as periodicity and duration, which in one embodiment may be different than those the UE requested. In this case, the eNB supplied parameters will control. The throttling response is sent, in one embodiment, via MAC layer signaling. During the throttling period, the eNB prevents the LAA SCell from scheduling traffic to that specific, requesting UE for the agreed duration. No other UE is affected. In one embodiment, the UE may optionally send a LAA throttling stop request, for example if the UE does not in fact need the allotted time in the non-cellular access technology. The eNB may respond with a LAA throttling stop response.

Figure 3:
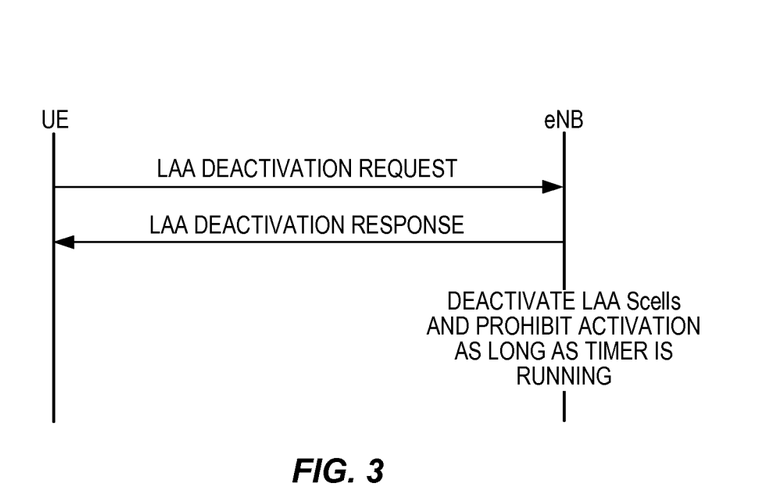
FIG. 3 is a signaling diagram of LAA deactivation control plane signaling.

In this context, deactivation means that the eNB is requested to deactivate the SCell for the specific UE making the request. Even though the SCell is configured for a number of UEs, only the specific UE that made the request is affected. FIG. 3 depicts a representative signaling diagram depicting the deactivation control plane signaling. Initially, the UE sends a LAA deactivation request to the eNB. The request may include the length for the deactivation, depending on an estimated duration for known tasks in the non-cellular access technology. The eNB sends the UE a LAA deactivation response, which may be a denial or acknowledgement. If an acknowledgement, the response may include parameters, such as duration, which in one embodiment may be different than those the UE requested. In this case the eNB supplied parameters control. The response is sent, in one embodiment, via MAC layer signaling. During the deactivation period, the eNB deactivates scheduling only for that specific, requesting UE from the LAA SCell. The SCell remain active and no other UE is affected.

Once the throttling or deactivation request is acknowledged, the UE can use its single receiver circuitry, including the RF front end, to access a non-cellular access domain, e.g., Wi-Fi, during the determined time slots according to a determined sharing parameter. Thus, the receiver circuitry is shared between cellular and non-cellular radio access technologies by time-division multiplexing. For example, a proportion of time slots are allocated between Wi-Fi and LAA LTE, according to the determined sharing parameter. The time division split can be based on UE request or overriding parameters communicated to the UE by the eNB, and/or by the sharing parameter as set or calculated by the UE.

Figure 4:
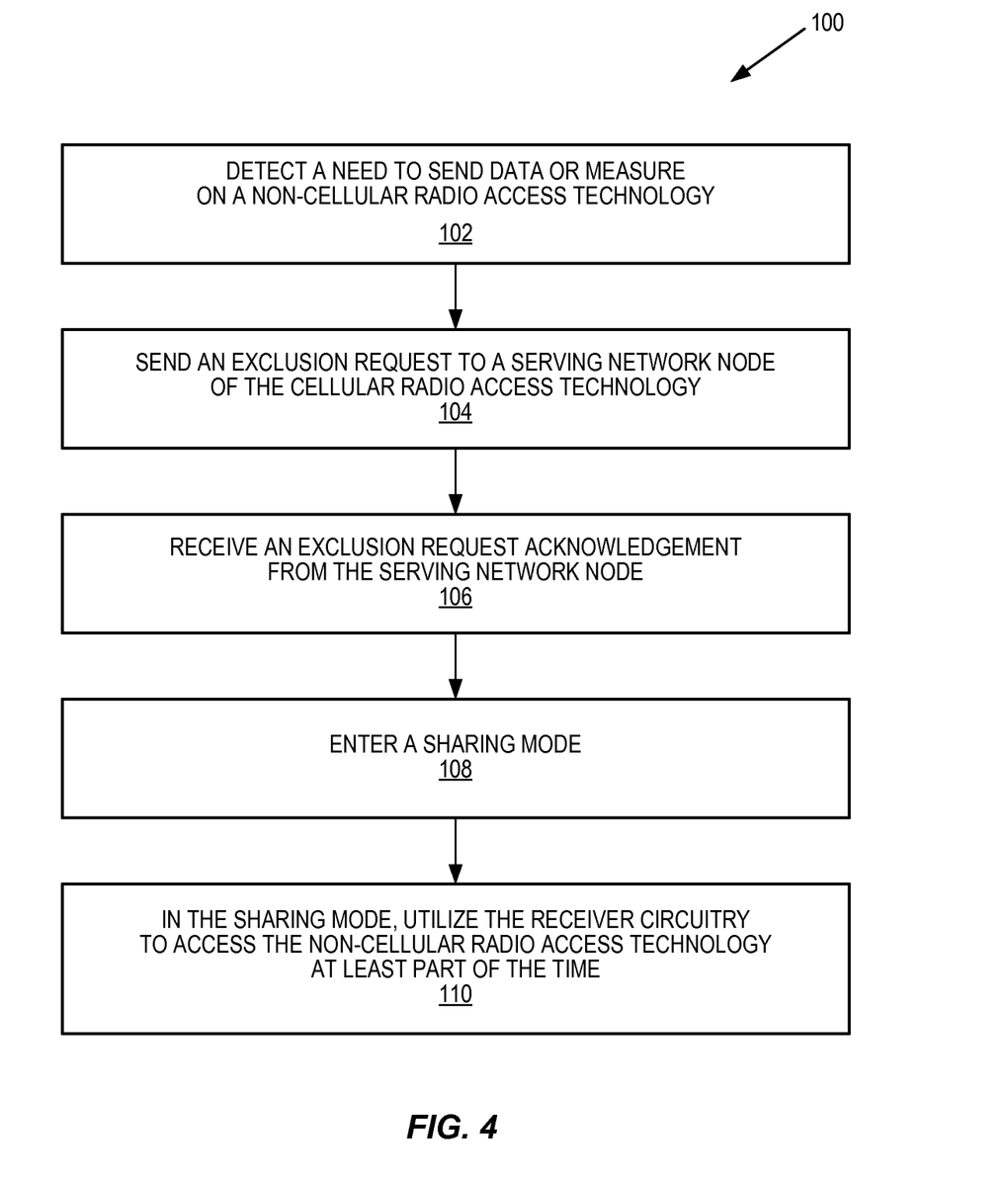
FIG. 4 is a flow diagram of a method performed by a radio network device.

The throttling or deactivation functionality can optionally be terminated once the Wi-Fi sharing is no longer required, or stopped by a stop request sent from the UE to the eNB. FIG. 4 depicts a method 100 in a radio network device (such as a UE) for sharing receiver circuitry between two (or more) radio access technologies (in the same frequency range), for example LAA LTE and Wi-Fi. The radio network device is connected to a cellular radio access technology. The radio network device detects a need to send data or measure on another (non-cellular) available radio access technology, e.g. Wi-Fi (block 102). The UE sends a LAA exclusion request (throttling or deactivation) to a serving radio network node of the cellular radio access technology, e.g. eNB (block 104). The radio network device receives an exclusion request acknowledgement from the serving network node (block 106). The radio network device enters a sharing mode (block 108) and while in the sharing mode, switches the receiver circuitry to the non-cellular radio access technology at least part of the time (block 110). In one embodiment, the radio network device time-division multiplexes between the cellular and non-cellular radio access technologies according to a sharing parameter.

Figure 5:
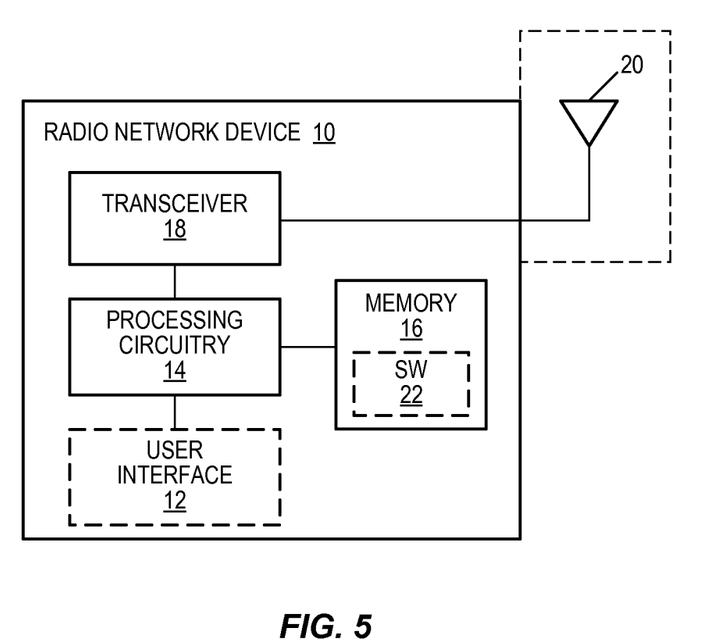
FIG. 5 is a block diagram of a radio network device.

FIG. 5 depicts a radio network device 10 operative in both a cellular radio access technology, such as LTE, and a non-cellular radio access technology, such as Wi-Fi. A radio network device 10 is any type device capable of communicating with a network node and/or access point using radio signals. A radio network device 10 may therefore refer to a machine-to-machine (M2M) device, a machine-type communications (MTC) device, a Narrowband Internet of Things (NB IoT) device, etc. The radio network device 10 may also be a User Equipment (UE), such as a cellular telephone or "smartphone." A radio network device 10 may also be referred to as a radio device, a radio communication device, a wireless terminal, or simply a terminal—unless the context indicates otherwise, the use of any of these terms is intended to include device-to-device UEs or devices, machine-type devices, or devices capable of machine-to-machine communication, sensors equipped with a radio network device, wireless-enabled table computers, mobile terminals, smart phones, laptop-embedded equipped (LEE), laptop-mounted equipment (LME), USB dongles, wireless customer-premises equipment (CPE), etc. In some embodiments, the radio network device 10 includes a user interface 12 (display, touchscreen, keyboard or keypad, microphone, speaker, and the like); in other embodiments, such as in many M2M, MTC, or NB IoT scenarios, the radio network device 10 may include only a minimal, or no, user interface 12 (as indicated by the dashed lines of block 12 in FIG. 5). The radio network device 10 also includes processing circuitry 14; memory 16; and radio circuits, such a transceiver 18, one or more antennas 20, and the like, to effect wireless communication across an air interface to one or more radio network nodes and/or access points. As indicated by the dashed lines, the antenna(s) 20 may protrude externally from the radio network device 10, or the antenna(s) 20 may be internal.

Figure 6:
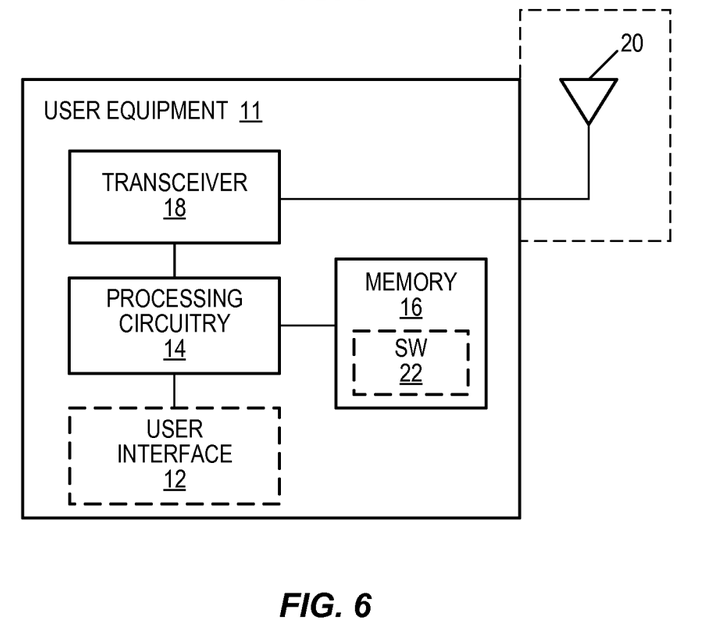
FIG. 6 is a block diagram of a UE.

FIG. 6 depicts an embodiment in which the radio network device 10 is a UE 11. In general, the UE includes the same circuits and components described above. In particular, the UE 11 may include a sophisticated user interface 32, and may additionally include features such as a camera, accelerometer, satellite navigation signal receiver circuitry, vibrating motor, and the like (not depicted in FIG. 6).

According to embodiments of the present invention, the memory 16 is operative to store, and the processing circuitry 14 operative to execute, software 22 which when executed is operative to cause the radio network device 10 to generate and send an exclusion request to a serving network node in a cellular radio access technology, throttling or deactivating the scheduling of cellular traffic to the device 10, so as to send or measure on a non-cellular radio access technology, as described and claimed herein. In particular, the software 22, when executed on the processing circuitry 14, is operative to perform the method 100 described and claimed herein. This allows the radio network device 10 to use the same receiver circuitry for both the cellular and non-cellular radio access technologies, without missing any control or user plane traffic from the cellular radio access technology.

Figure 7:
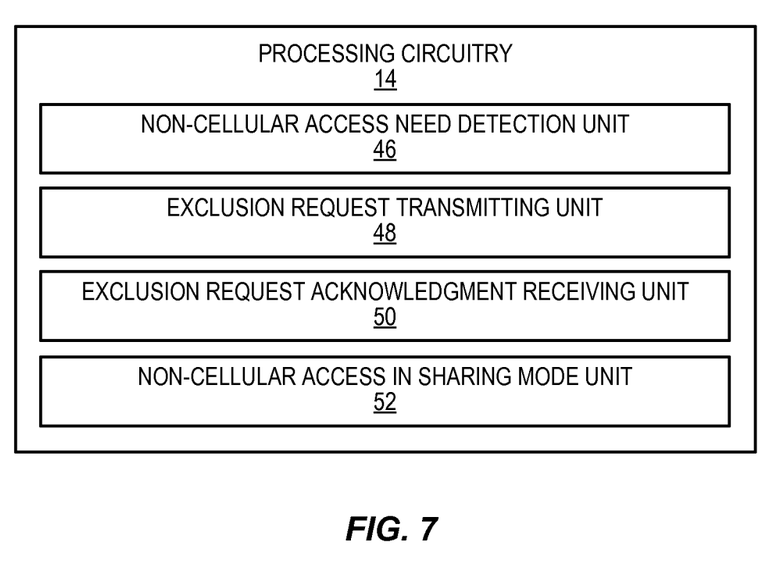
FIG. 7 is a diagram of physical units in processing circuitry in the radio network device of FIG. 5 or the UE of FIG. 6.

FIG. 7 illustrates example processing circuitry 14, such as that in the radio network device 10 of FIG. 5 or the UE 11 of FIG. 6. The processing circuitry 14 comprises a plurality of physical units. In particular, the processing circuitry 14 comprises a non-cellular access need detection unit 46, an exclusion request transmitting unit 48, an exclusion request acknowledgement receiving unit 50, and a non-cellular access in sharing mode unit 52.

The non-cellular access need detection unit 46 is configured to detect a need for the network radio device 10 to access a non-cellular radio access technology, such as to send data or to perform measurements. The exclusion request transmitting unit 48 is configured to generate and transmit to the serving radio network node in the cellular radio access technology an exclusion request, such as a throttling or deactivation request, which may include parameters such as duration and periodicity. The exclusion request acknowledgement receiving unit 50 is configured to receive from the serving radio network node an acknowledgement of the exclusion request, indicating that the serving radio network node has granted the exclusion request; the acknowledgement may include parameters (e.g., duration and periodicity), which may be different than those sent in the exclusion request. The non-cellular access in sharing mode unit 52 is configured to, while in a sharing mode, access the non-cellular radio access technology at least part of the time, such as according to parameters received from the serving radio network node.

Figure 8:
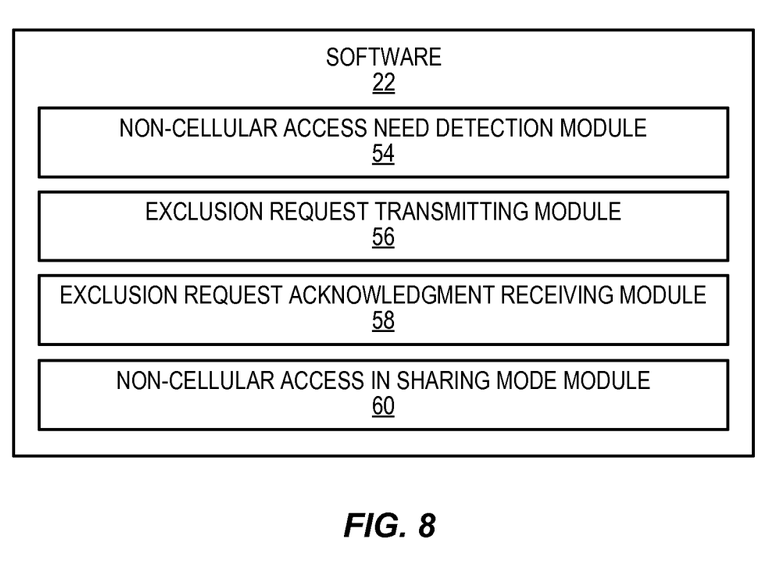
FIG. 8 is a diagram of software modules in memory in the radio network device of FIG. 5 or the UE of FIG. 6.

FIG. 8 illustrates example software 22, such as that in memory 16 in the radio network device 10 of FIG. 6 or the UE 11 of FIG. 7. The software 22 comprises a plurality of software modules. In particular, the software 22 comprises a non-cellular access need detection module 54, an exclusion request transmitting module 56, an exclusion request acknowledgement receiving module 58, and a non-cellular access in sharing mode module 60.

The non-cellular access need detection module 54 is configured to detect a need for the network radio device 10 to access a non-cellular radio access technology, such as to send data or to perform measurements. The exclusion request transmitting module 56 is configured to generate and transmit to the serving radio network node in the cellular radio access technology an exclusion request, such as a throttling or deactivation request, which may include parameters such as duration and periodicity. The exclusion request acknowledgement receiving module 58 is configured to receive from the serving radio network node an acknowledgement of the exclusion request, indicating that the serving radio network node has granted the exclusion request; the acknowledgement may include parameters (e.g., duration and periodicity), which may be different than those sent in the exclusion request. The non-cellular access in sharing mode module 60 is configured to, while in a sharing mode, access the non-cellular radio access technology at least part of the time, such as according to parameters received from the serving radio network node.

Figure 9:
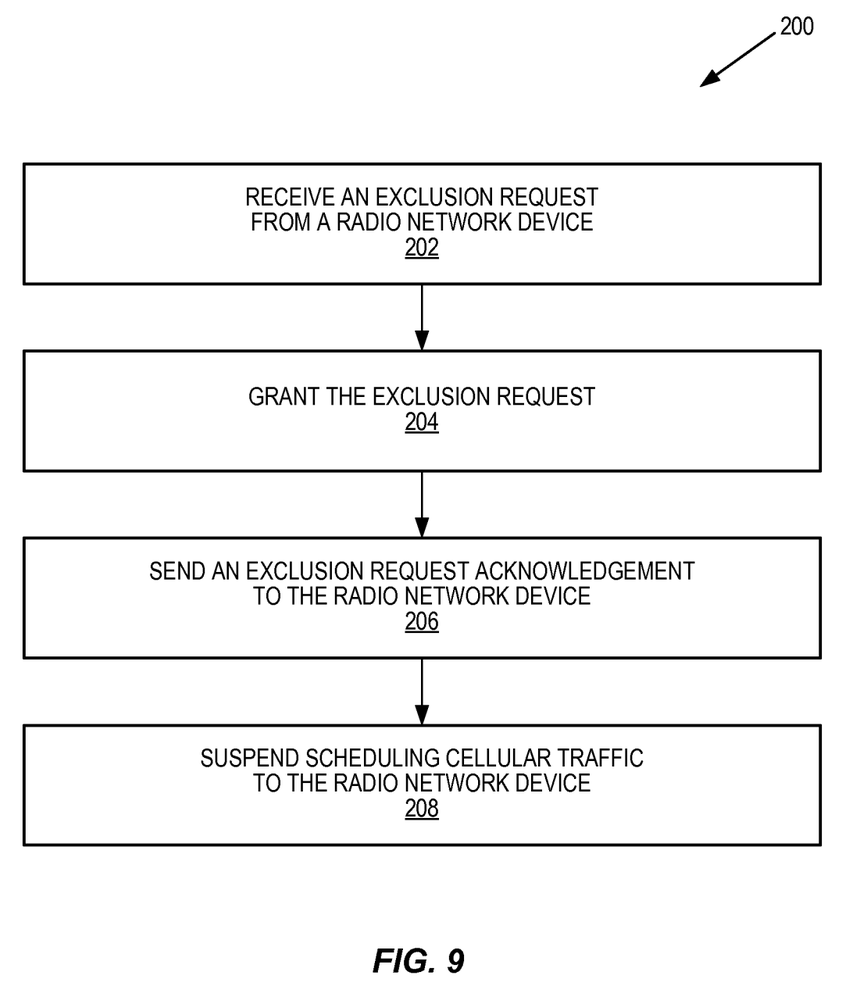
FIG. 9 is a flow diagram of a method performed by a wireless communication network node.

FIG. 9 depicts a method 200 in a radio network node (e.g., base station or eNB) operative in a cellular radio access technology (e.g., LAA LTE) for selectively scheduling traffic to a specific requesting radio network device 10 connected to the cellular system, for allowing the device to share receiver circuitry between the cellular radio access technology and a non-cellular radio access technology. The node receives an exclusion request (throttling or deactivation) from a radio network device 10 (block 202). The node grants the exclusion request (block 204), and sends an exclusion request acknowledgement to the radio network device 10 (block 206). The exclusion request acknowledgement may include parameters, such as duration and periodicity, which may be different than corresponding parameters included in the received exclusion request. The node then suspends scheduling cellular traffic to the requesting radio network device 10, for at least some duration (block 208).

Figure 10:
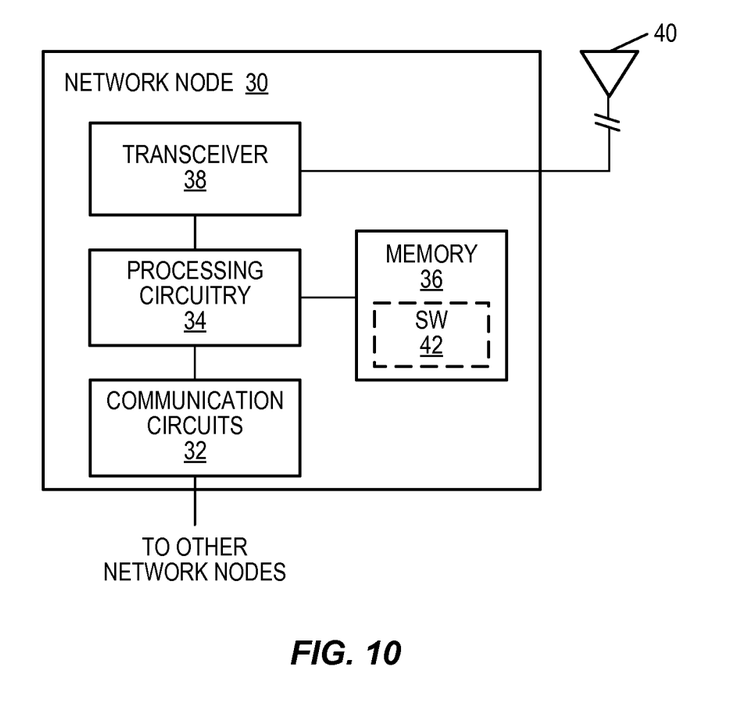
FIG. 10 is a block diagram of a wireless communication network node.

FIG. 10 depicts a radio network node 30 operative in a cellular radio access technology, such as LAA LTE. The radio network node 30 includes communication circuits 32 operative to exchange data with other network nodes; processing circuitry 34; memory 36; and radio circuits, such as a transceiver 38, one or more antennas 40, and the like, to effect wireless communication across an air interface to one or more radio network devices 10, such as UE 11. As indicated by the broken connection to the antenna(s) 40, the antenna(s) may be physically located separately from the radio network node 30, such as mounted on a tower, building, or the like. Although the memory 36 is depicted as being separate from the processing circuitry 34, those of skill in the art understand that the processing circuitry 34 includes internal memory, such as a cache memory or register file. Those of skill in the art additionally understand that virtualization techniques allow some functions nominally executed by the processing circuitry 34 to actually be executed by other hardware, perhaps remotely located (e.g., in the so-called "cloud").

Figure 11:
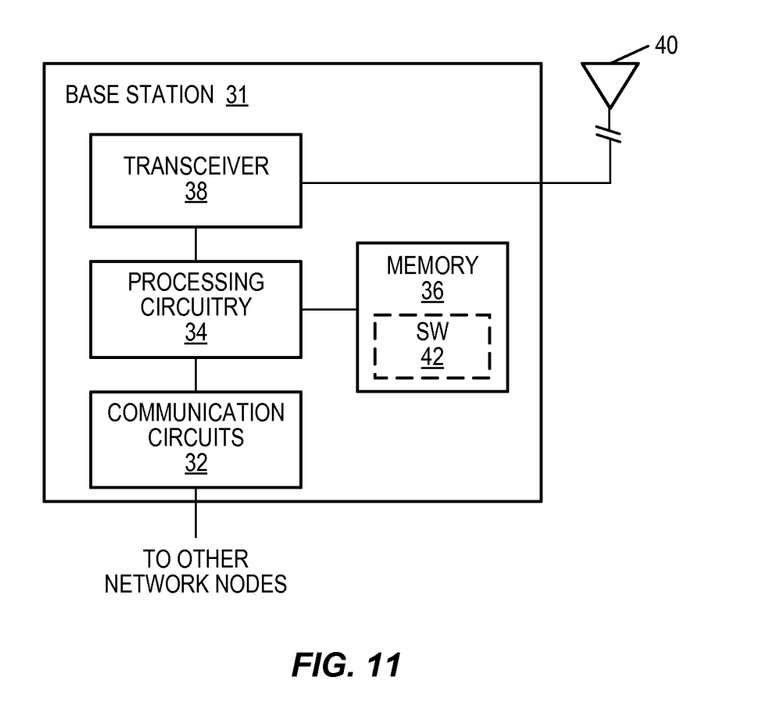
FIG. 11 is a block diagram of a base station.

FIG. 11 depicts an embodiment in which the radio network node 30 is a base station 31, known in LTE as an eNodeB or eNB. In general, the base station 31 includes the same circuits and components described above.

According to one embodiment of the present invention, the processing circuitry 34 is operative to cause the radio network node 30 to suspend scheduling cellular traffic for a particular radio network device 10 upon request by that device 10, as described and claimed herein. In particular, the processing circuitry 34 is operative to perform the method 200 described and claimed herein. This allows the requesting radio network device 10 to use the same receiver circuitry to access a non-cellular radio access technology, such as a WLAN (e.g., Wi-Fi), while maintaining connectivity to the cellular radio access technology and without risk of missing signaling from the cellular network.

Figure 12:
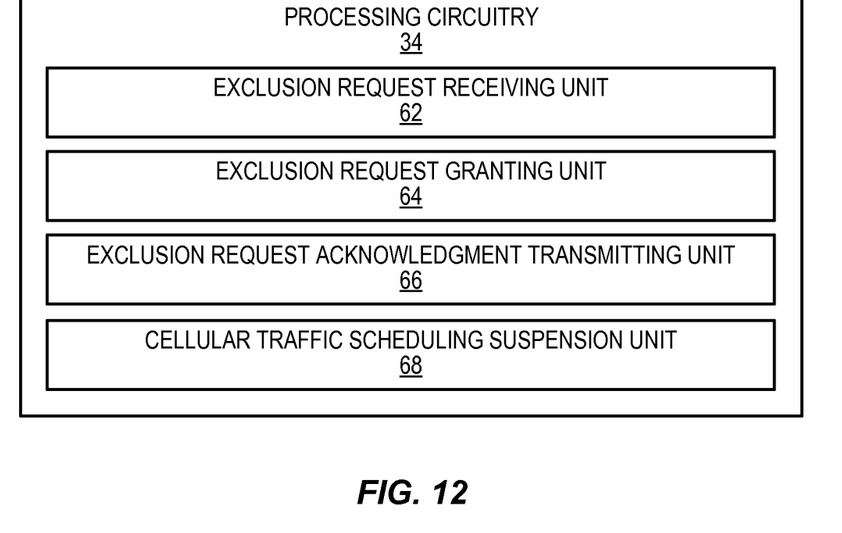
FIG. 12 is a diagram of physical units in processing circuitry in the wireless communication network node of FIG. 10 or the base station of FIG. 11.

FIG. 12 illustrates example processing circuitry 34, such as that in the radio network node 30 of FIG. 10 or the base station 11 of FIG. 11. The processing circuitry 34 comprises a plurality of physical units. In particular, the processing circuitry 34 comprises an exclusion request receiving unit 62, an exclusion request granting unit 64, an exclusion request acknowledgement transmitting unit 66, and a cellular traffic scheduling suspension unit 68.

The exclusion request receiving unit 62 is configured to receive, from a radio network device 10, an exclusion request (throttling or suspension) such that no cellular traffic is scheduled to the requesting radio network device 10 for at least some duration. The exclusion request may include parameters, such as requested duration and periodicity. The exclusion request granting unit 64 is configured to grant (or not) the requested exclusion (throttling or suspension) of cellular traffic scheduling. The exclusion request acknowledgement transmitting unit 66 is configured to transmit, to the requesting radio network device 10, an acknowledgement of the exclusion request. The acknowledgement may indicate the request is granted or denied. If granted, the acknowledgement may include parameters (e.g., duration and periodicity) which may differ from corresponding parameters in the exclusion request. The cellular traffic scheduling suspension unit 68 is configured to suspend the scheduling of cellular traffic to the requesting radio network device 10 if the exclusion request is granted.

Figure 13:
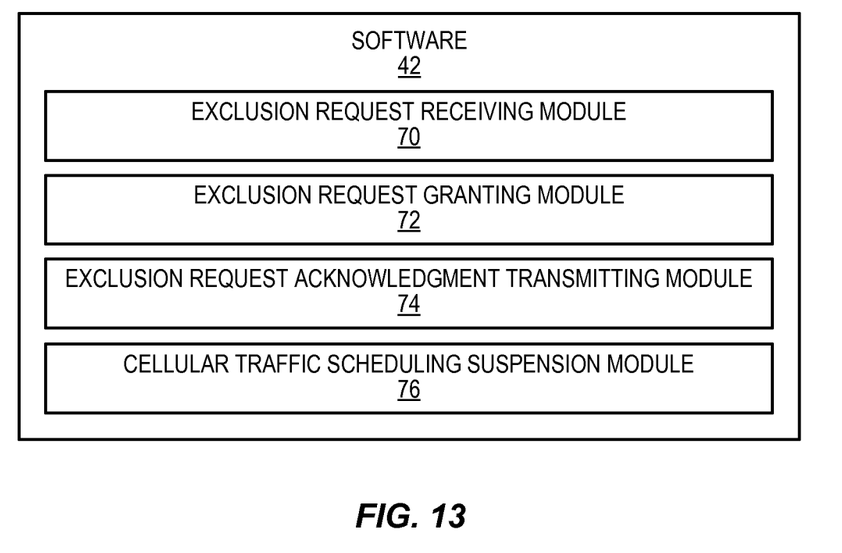
FIG. 13 is a diagram of software modules in memory in the wireless communication network node of FIG. 10 or the base station of FIG. 11.

FIG. 13 illustrates example software 42, such as that in memory 36 in the radio network node 30 of FIG. 10 or the base station 31 of FIG. 11. The software 42 comprises a plurality of software modules. In particular, the software 42 comprises an exclusion request receiving module 70, an exclusion request granting module 72, an exclusion request acknowledgement transmitting module 74, and a cellular traffic scheduling suspension module 76.

The exclusion request receiving module 70 is configured to receive, from a radio network device 10, an exclusion request (throttling or suspension) such that no cellular traffic is scheduled to the requesting radio network device 10 for at least some duration. The exclusion request may include parameters, such as requested duration and periodicity. The exclusion request granting module 72 is configured to grant (or not) the requested exclusion (throttling or suspension) of cellular traffic scheduling. The exclusion request acknowledgement transmitting module 74 is configured to transmit, to the requesting radio network device 10, an acknowledgement of the exclusion request. The acknowledgement may indicate the request is granted or denied. If granted, the acknowledgement may include parameters (e.g., duration and periodicity) which may differ from corresponding parameters in the exclusion request. The cellular traffic scheduling suspension module 76 is configured to suspend the scheduling of cellular traffic to the requesting radio network device 10 if the exclusion request is granted.

In all embodiments, the processing circuitry 14, 34 may comprise any sequential state machine operative to execute machine instructions stored as machine-readable computer programs in memory 16, 36, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), or any combination of the above.

In all embodiments, the memory 16, 36 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the radio circuits may comprise one or more transceivers 18, 38 used to communicate with one or more other transceivers via a Radio Access Network (RAN) according to one or more communication protocols known in the art or that may be developed, such as IEEE 802.xx, CDMA, WCDMA, GSM, LTE, UTRAN, WiMax, NB-IoT, or the like. The transceiver 18, 38 implements transmitter and receiver functionality appropriate to the RAN links (e.g., frequency allocations and the like). The transmitter and receiver functions may share circuit components and/or software, or alternatively may be implemented separately.

In all embodiments, the communication circuits 12 may comprise a receiver and transmitter interface used to communicate with one or more other nodes over a communication network according to one or more communication protocols known in the art or that may be developed, such as Ethernet, TCP/IP, SONET, ATM, IMS, SIP, or the like. The communication circuits 12 implement receiver and transmitter functionality appropriate to the communication network links (e.g., optical, electrical, and the like). The transmitter and receiver functions may share circuit components and/or software, or alternatively may be implemented separately.

Embodiments of the present invention present numerous advantages over the prior art. By requesting an exclusion (throttling or deactivation) of scheduling on the cellular radio access technology, the radio network device may send data or measure on a non-cellular radio access technology, using the same (or parts of the same) receiver circuitry, without risk of missing cellular traffic. Dual use of the receiver technology allows the radio network device to reduce cost, reduce size and hence form factor, and reduce power consumption and hence prolong battery life.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method in a radio network device of utilizing the same receiver circuitry to receive signals in both cellular and non-cellular radio access technologies, the radio network device being connected to a cellular radio access technology, the method comprising:
   detecting a need to send data or measure on a non-cellular radio access technology;
   sending an exclusion request to a serving network node of the cellular radio access technology;
   receiving an exclusion request acknowledgement from the serving network node;
   entering a sharing mode; and
   in the sharing mode, utilizing the receiver circuitry to access the non-cellular radio access technology at least part of the time.

2. The method of claim 1 wherein the exclusion request comprises a throttling request, requesting that no cellular traffic be scheduled to the radio network device for at least a first duration.

3. The method of claim 2 wherein the throttling request further includes a requested periodicity with which cellular traffic to the radio network device be throttled.

4. The method of claim 1 wherein the exclusion request comprises a deactivation request, requesting that cellular traffic to the radio network device be suspended.

5. The method of claim 1, wherein utilizing the receiver circuitry to access the non-cellular radio access technology at least part of the time in the sharing mode comprises time division multiplexing the receiver circuitry between the cellular and non-cellular radio access technologies according to any duration and periodicity parameters received in the exclusion request acknowledgement from the serving network node, if different than corresponding parameters sent in the exclusion request.

6. The method of claim 1, further comprising sending an exclusion termination request to the serving network node of the cellular radio access technology, requesting that the radio network device be freely scheduled on the cellular radio access technology.

7. The method of claim 1, wherein the radio network device is a User Equipment (UE), the receiver circuitry comprises one or more antennas and at least one filter, and the non-cellular radio access technology conforms to IEEE 802.11x specifications.

8. A radio network device, comprising:
   one or more antennas;
   a transceiver including receiver circuitry; and
   processing circuitry operatively connected to the transceiver and operative to
      detect a need to send data or measure on a non-cellular radio access technology;
      send an exclusion request to a serving network node of the cellular radio access technology;
      receive an exclusion request acknowledgement from the serving network node;
      enter a sharing mode; and
      in the sharing mode, utilize the receiver circuitry to access the non-cellular radio access technology at least part of the time.

9. The radio network device of claim 8 wherein the exclusion request comprises a throttling request, requesting that no cellular traffic be scheduled to the radio network device for at least a first duration.

10. The radio network device of claim 8 wherein the throttling request further includes a requested periodicity with which cellular traffic to the radio network device be throttled.

11. The radio network device of claim 8 wherein the exclusion request comprises a deactivation request, requesting that cellular traffic to the radio network device be suspended.

12. The radio network device of claim 8 wherein utilizing the receiver circuitry to access the non-cellular radio access technology at least part of the time in the sharing mode comprises time division multiplexing the receiver circuitry between the cellular and non-cellular radio access technologies according to any duration and periodicity parameters received in the exclusion request acknowledgement from the serving network node, if different than corresponding parameters sent in the exclusion request.

13. The radio network device of claim 8 wherein the processing circuitry is further operative to send an exclusion termination request to the serving network node of the cellular radio access technology, requesting that the radio network device be freely scheduled on the cellular radio access technology.

14. A method in a radio network node operative in a cellular radio access technology for selectively scheduling traffic to a specific requesting radio network device connected to the cellular system, allowing the device to share receiver circuitry between the cellular radio access technology and a non-cellular radio access technology, the method comprising:
receiving an exclusion request from a radio network device;
granting the exclusion request;
sending an exclusion request acknowledgement to the radio network device; and
suspending scheduling cellular traffic to the radio network device.

15. The method of claim 14 wherein the exclusion request comprises a throttling request, requesting that no cellular traffic be scheduled to the radio network device for at least a first duration.

16. The method of claim 15 wherein the throttling request further includes a requested periodicity with which cellular traffic to the radio network device be throttled.

17. The method of claim 14 wherein the exclusion request comprises a deactivation request, requesting that cellular traffic to the radio network device be suspended.

18. The method of claim 14 wherein the exclusion request acknowledgement includes duration and periodicity parameters, which may be different than corresponding parameters received in the exclusion request.

19. The method of claim 14 further comprising:
receiving an exclusion termination request from the radio network device;
granting the exclusion termination;
sending an exclusion termination acknowledgement to the radio network device; and
freely scheduling cellular traffic to the radio network device.

20. A radio network node operative in a cellular radio access technology, comprising:
one or more antennas;
a transceiver; and
processing circuitry operatively connected to the transceiver and operative to
receive an exclusion request from a radio network device;
grant the exclusion request;
send an exclusion request acknowledgement to the radio network device; and
suspend scheduling cellular traffic to the radio network device.

21. The radio network node of claim 20 wherein the exclusion request comprises a throttling request, requesting that no cellular traffic be scheduled to the radio network device for at least a first duration.

22. The radio network node of claim 21 wherein the throttling request further includes a requested periodicity with which cellular traffic to the radio network device be throttled.

23. The radio network node of claim 20 wherein the exclusion request comprises a deactivation request, requesting that cellular traffic to the radio network device be suspended.

24. The radio network node of claim 20 wherein the exclusion request acknowledgement includes duration and periodicity parameters, which may be different than corresponding parameters received in the exclusion request.

25. The radio network node of claim 20 wherein the processing circuitry is further operative to:
receive an exclusion termination request from the radio network device;
grant the exclusion termination;
send an exclusion termination acknowledgement to the radio network device; and
freely schedule cellular traffic to the radio network device.

* * * * *